July 24, 1928.

D. F. DOMIZI 1,677,917

MOTOR VEHICLE CONSTRUCTION

Filed Jan. 7, 1927     3 Sheets-Sheet 1

Inventor
David F. Domizi
By Jhing Harness
Attorney

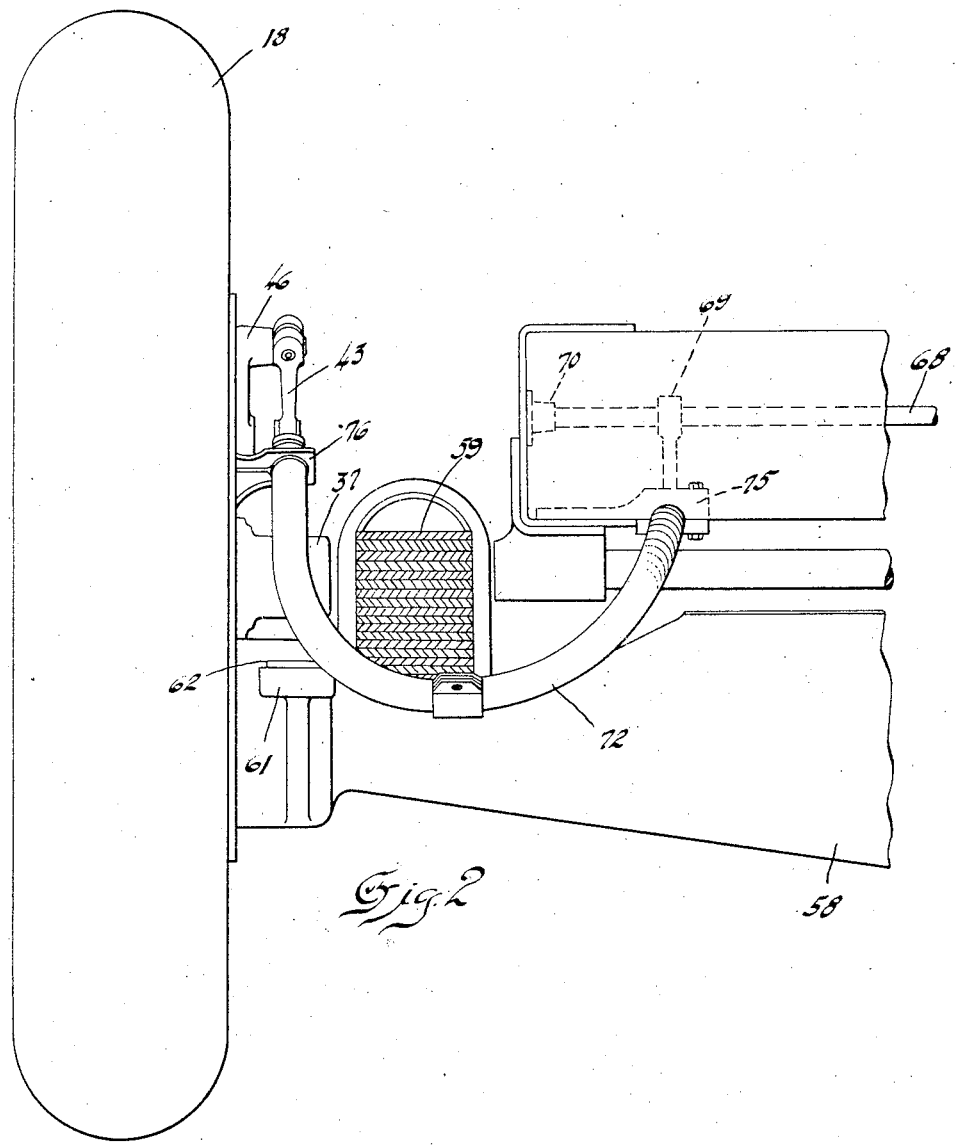
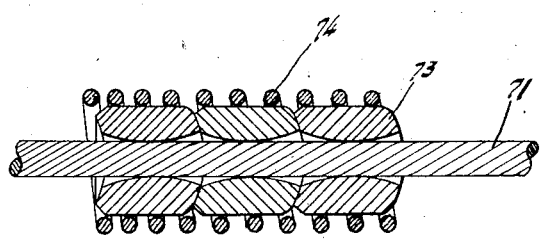

July 24, 1928.

D. F. DOMIZI 1,677,917

MOTOR VEHICLE CONSTRUCTION

Filed Jan. 7, 1927

Inventor
David F. Domizi
By Irving Harness
Attorney

Patented July 24, 1928.

1,677,917

UNITED STATES PATENT OFFICE.

DAVID F. DOMIZI, OF CLEVELAND, OHIO, ASSIGNOR, BY MESNE ASSIGNMENTS, TO RELAY MOTOR PRODUCTS CORPORATION, OF BRIDGEPORT, CONNECTICUT, A CORPORATION OF DELAWARE.

MOTOR-VEHICLE CONSTRUCTION.

Application filed January 7, 1927. Serial No. 159,597.

My invention relates to improvements in driving and braking mechanism for motor vehicles wherein the weight of the vehicle together with its load is utilized to assist in driving or retarding the driving road wheels in addition to such action normally obtained from the vehicle's source of motive power.

My invention more specifically deals with the mounting of the load carrying member around the axle drive shafts which latter are eccentric to and below the centers of the road wheels, thus eliminating a center load carrying axle and inverting the usual wheel hubs and supporting such spindles in antifriction bearings carried by a housing which is integral with the eccentrically disposed load carrying member which in turn surrounds the axle drive shafts. In this invention, the vehicle springs are seated on a housing which surrounds the load carrying member with anti-friction bearings interposed between the load carrying member and the housing, thus reducing to a minimum any frictional tendency to oppose or delay the effect of the vehicle load in assisting the driving wheels over an obstruction, or in assisting the braking action. This invention also includes a means for operating the wheel braking mechanism, permitting the swinging and climbing of the entire construction in its normal functioning without modifying the brake operating pressures. Cushioned stops limit the climbing action at predetermined points.
With the above and other objects in view, my invention consists in the arrangement, combination and construction of the various elements of my improved device as described in the specification, claimed in my claims and shown in the accompanying drawings in which:

Fig. 2 is a rear elevation of one end of the rear axle in conjunction with the rear end of the vehicle frame, the load spring being cut away to disclose brake operating mechanism.

Fig. 4 is a section of brake operating cable housing.

Figure 1:
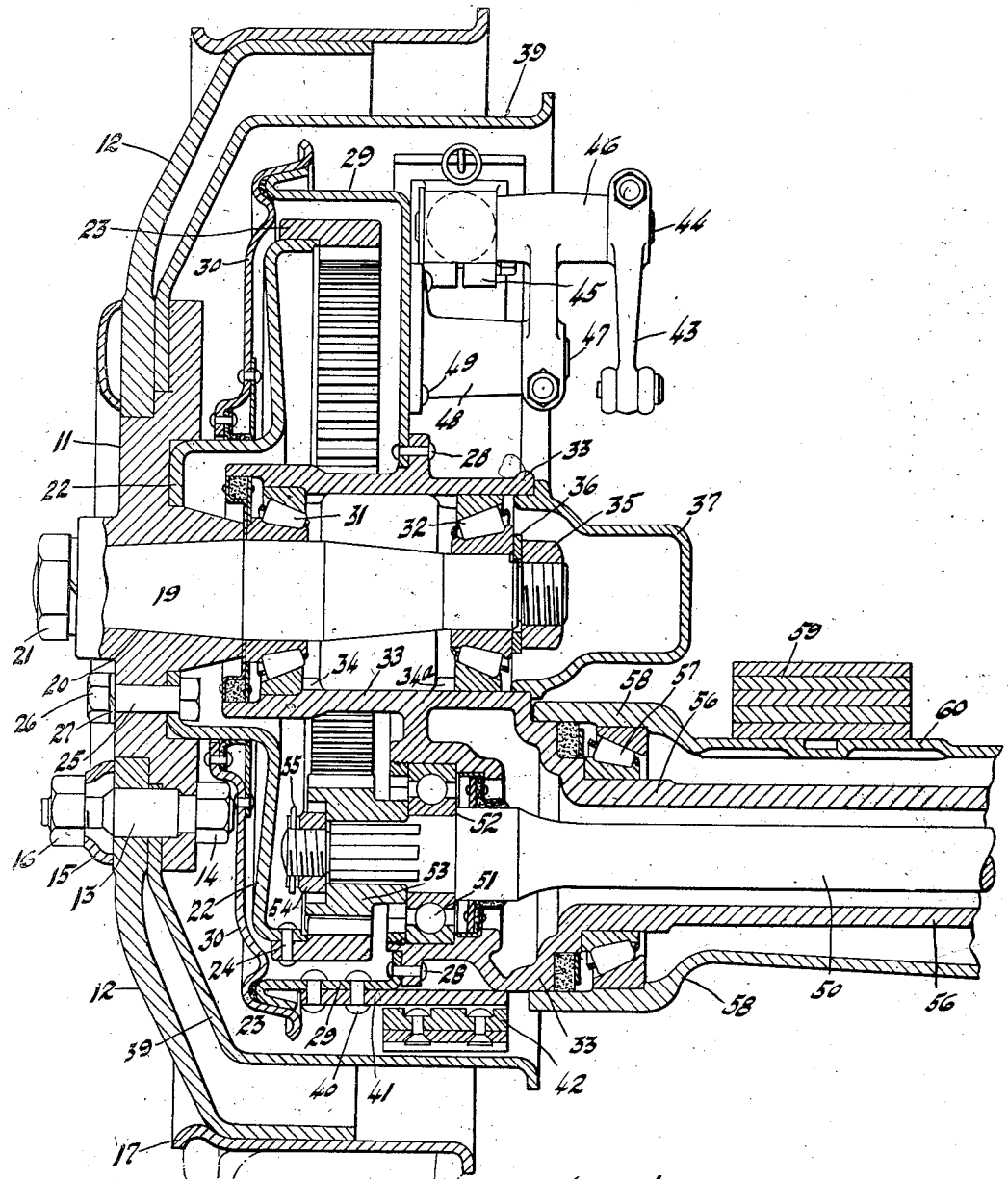
Fig. 1 is a rear elevation in section of one end of the rear axle and wheel construction.

In the drawings, 11 is the driving wheel hub, to which is attached the wheel body 12 by means of the studs 13, nuts 14, annular ring 15 and nuts 16. On the wheel body 12 is mounted the tire rim 17 to which is attached the tire 18 in any conventional manner. This combination permits the removal of the wheel body 12, rim 17 and tire 18 as a unit without disturbing the hub 11, by merely removing the nuts 16 and ring 15. The spindle 19 is secured in the hub 11 by drawing up on the taper 20 by means of the nut 21 threaded on the end of the spindle 19. The spider 22 is rigidly attached to the hub 11 by the studs 25, nuts 26 and lockwashers 27. An internal gear ring 23 is attached to the spider 22 by a series of rivets 24, thus permitting the gear ring 23 to be made of a different material from the spider 22, also making replacement of the ring 23 possible without replacing the balance of the associated parts. The spindle 19 is carried by the antifriction bearings 31 and 32 mounted in the housing 33 and held in spaced relation by the shoulders 34 and 34ª. The bearings 31 and 32 are adjusted with relation to each other by means of the nut 35 and collar 36. The opening through which adjusting nut 35 is operated is closed by the dust cap 37 which is bolted to the case 33 by the bolts 38 and serves to prevent entrance of dust and dirt into the housing 33 into contact with the bearings 31 and 32, as well as another purpose described later. The brake drum 39 is secured to the hub 11 by the same studs 13 and nuts 14 which hold the wheel body 12 to the hub 11.

Attached to the housing 33 by the rivets 28 is the casing 29, which together with the plate 30 serves to form a grease retaining housing about the ring gear 23 and the spider 22. Attached to the casing 29 by means of the rivets 40 is the brake anchor 41. Any brake reaction received by the brake band 42 when brought in contact with the brake drum 39, is imparted in turn to the housing 33. Braking action is produced by pulling on the brake lever 43 and thus rotating the shaft 44 to which is attached the shoe expanding cam 45. The brake shaft 44 is supported in the swinging bracket 46 which pivots on the pin 47 which in turn is supported in the bracket 48 that is riveted to the casing 29 by the rivets 49. Thus it will be seen that the brake anchorage and operating means are both attached to the same element (29) which itself is rigidly attached to the main housing 33.

In the lower portion of the housing 33 is mounted the drive shaft 50 through the medium of the antifriction bearing 51 which is located laterally by the shoulder 52 and the driving pinion 53, the latter being splined to the drive shaft 50 and secured thereto by the nut 54 and cotter 55. The construction at the opposite end of the axle is identical with this just described, the two driving shafts 50 being operated from the vehicle engine and transmission by the propeller shaft 80 through a differential mechanism (not shown) midway between the pinions 53. Pinion 53 meshes accurately with the ring gear 23 so that any rotation of the shaft 50 is imparted to the wheel.

Toward the center of the vehicle, the housing 33 assumes a sleeve-like form as at 56, with a duplicate sleeve on the other side, the two being rigidly joined by a bridge arching around the differential mechanism and its carrier (not shown).

Borne upon the sleeve portion 56 of the housing 33 is an antifriction bearing 57 supporting the main housing 58 with its integral spring seats 60 to which are rigidly attached the load springs 59. A duplicate structure is present on the opposite end of the axle and the housing 58 serves as an enclosure for and supporting the main driving gears, differential and associated parts (not shown) of conventional design.

In line with the body of the cover 37, the housing 58 carries limit stops 61 with inserted rubber blocks 62. The leaf springs 59 are connected to the chassis frame 63 at their front ends by the pins 64 carried in the brackets 65 thus transferring any forward thrust of the springs to the frame. The rear ends of the leaf springs 59 are connected to the chassis frame 63 through the shackles 66 carried in the brackets 67, thus allowing for elongation of the springs occasioned by their deflection. It will be noted that any axial rotation of the housing 58 is prevented by the leaf springs through their rigid connection with the housing and their connection with the chassis frame just described.

Figure 3:
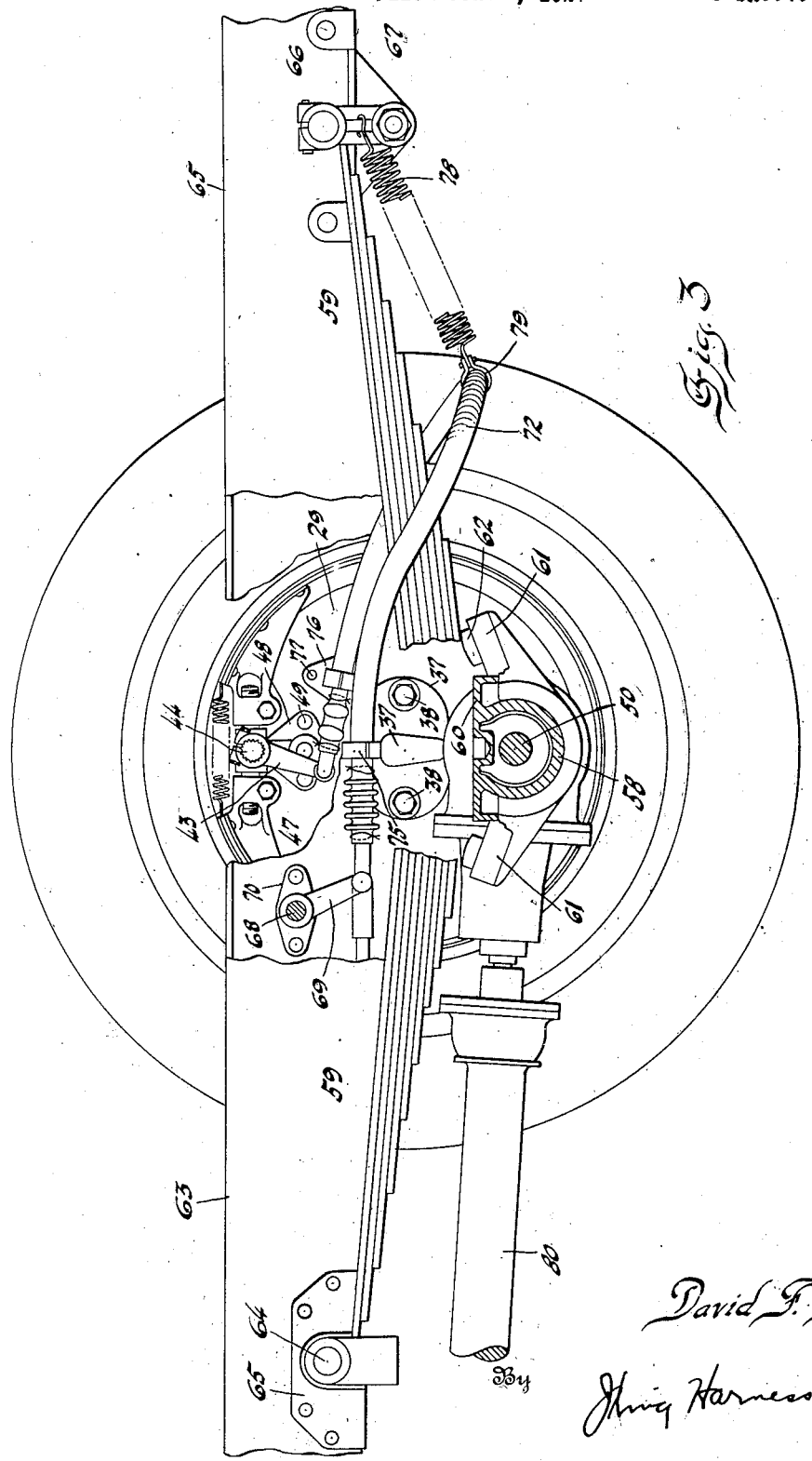
Fig. 3 is a side elevation of the rear portion of the vehicle chassis with a wheel removed and the axle and frame cut away to disclose brake operating mechanism and limit stops.

Across the chassis frame just forward of the rear axle is the brake shaft 68 supported in the brackets 70 and carrying the brake levers 69, one on each side of the vehicle. Attached to one of the levers 69 is a pull rod 65 (not shown) that extends forward and connects with a foot pedal or hand lever within the operator's control. Operating either the foot pedal or hand lever causes the brake shaft 68 to be rotated on its axis thus swinging the levers 69. Connected to the lever 69 is a flexible cable 71 carried in a flexible casing 72. The other end of this flexible cable is attached to the brake lever 43. The flexible casing 72 is made up of a series of annular shaped blocks 73 covered by the spiral wire 74 which holds them in contact with each other. The blocks 73 are so shaped that the entire assembly can be bent into various positions without binding the cable 71 passing through the holes in the blocks. The first one of the blocks 73 is secured in the bracket 75 which is attached to the chassis frame, and the last block is secured in the bracket 76 that is riveted to the housing 29 by the rivets 77. As shown, this flexible casing takes the form of a sweeping curve from its attachment in the chassis frame to its connection to the wheel housing. To keep it in this sweeping curve and avoid any possible kinks, the coil spring 78 is connected between the clip 79 on the casing 72 and some convenient point like on the spring shackle 66, as shown in Fig. 3. Now, when the brake lever 69 is operated, the cable 71 is pulled through the center of the casing 72 and the lever 43 is operated and the brakes are applied. The form of the casing 72 is maintained and kinks do not occur because the reaction to the pull on the cable 71 is resisted by the series of blocks 73 backing up against their anchorage in the bracket 75.

When the road wheels meet with rotative resistance, and motive power is applied to the shaft 50, the pinion 53 will start to climb up around the inside of the ring gear 23 and carry with it the entire housing 33 and its associated parts, the center of the shaft 50 moving forward and upward on the arc of a circle whose radius is the distance between the center of the spindle 19 and the center of the shaft 50. This forward and upward movement is imparted to the housing 58 through the antifriction bearings 51 and 57, but the housing 58 is restrained from rotating by the springs that are rigidly attached to it. Therefore, the upward motion lifts the springs and their load, and the forward motion moves the chassis frame forward with respect to the wheel center which is delayed by the obstruction mentioned. This swinging motion continues until the moment of the load ahead of the wheel center becomes sufficient to roll the wheel over the obstruction, whereupon the casing 58 swings down again to its normal position directly below the wheel center. The amount of swinging travel is restricted by the limit stop blocks 62 which come in contact with the cover 37. This prevents the swinging to attain a position where it would lock and cause trouble. During this swinging action the brake cable casing yields to the movement without kinking.

The reverse of the above described action occurs when the vehicle is backing and an obstruction is encountered, and again the vehicle weight above the springs serves to assist the wheel over the obstruction. It will also be quite evident that when the brakes are applied with the vehicle moving in either direction, the casing 33, to which the brakes are anchored, swings up around the wheel center in the proper direction to have the load on the springs meet the brake reaction with retarding resistance.

It will now be apparent that I have devised a novel and useful construction in a very simple combination. Obviously, changes in detail may be made by one skilled in the art without departing from the theory and spirit of my invention, and I do not care to limit myself to any particular form or arrangement of these elements.

What I claim is:

1. In combination, a wheel having a spindle, a dust cap for one end of said spindle, an axle housing swingable about said spindle, and means on said housing adapted to strike said cap to prevent complete rotation of the axle housing about the spindle.

2. In combination, a wheel having a spindle, a dust cap for one end of said spindle, an axle housing swingable about said spindle, and means on said housing adapted to strike said cap to prevent complete rotation of the axle housing about the spindle, said means comprising rubber padded lugs extending on opposite sides of the axle housing.

3. In combination, a road wheel, a housing provided with an off-set portion rotatably supporting said road wheel, said housing being bodily swingable about the center of said wheel, a second housing rotatably supported on the first mentioned housing, a pair of oppositely extending lateral arms on said second housing, and a projecting part on said off-set portion engageable with said arms for limiting said swinging movement of said first mentioned housing.

4. In combination, a housing provided with an off-set portion, bearings in said offset portion, a wheel spindle rotatably mounted in said bearings, a wheel secured to said spindle, an inwardly extending cap closing said off-set portion against entrance of dust into the same, a second housing rotatably supported on the first mentioned housing, and laterally extending arms on said second housing engageable with said cap for limiting swinging movement of the first mentioned housing about said spindle as a center.

5. In combination with a vehicle chassis, a pair of housings, one rotatably mounted around the other, the inner of said housings being provided with an off-set portion rotatably supporting a wheel and being bodily swingable about the center thereof, brake mechanism carried by the inner of said housings for retarding rotation of said wheel, a load carrying spring connecting the outer of said housings with said frame, a bearing cap on said off-set portion, a pair of laterally extending arms on said outer housing engageable with said bearing cap for limiting swinging movement of said inner housing in respect to said frame, and a flexible connection extending between said brake mechanism and said frame for applying said brake mechanism regardless of the swingable portion of said inner housing in respect to said frame.

6. In combination, a housing provided with an off-set portion, a road wheel rotatably supported by said off-set portion, means on said wheel and means carried by said housing co-operating to rotate said wheel, a second housing rotatably supported on the first mentioned housing, load carrying springs secured to said second housing, said first housing being bodily swingable about the center of said wheel, brake mechanism carried by the first mentioned housing bodily movable therewith, a flexible connection for operating said brake mechanism, and a pair of arms on said second housing co-operating with a part carried by the first mentioned housing for limiting the swinging movement thereof.

DAVID F. DOMIZI.